(12) United States Patent
Yoshida et al.

(10) Patent No.: US 9,252,440 B2
(45) Date of Patent: Feb. 2, 2016

(54) GAS SUPPLY SYSTEM

(71) Applicants: Kosei Yoshida, Gotenba (JP); Kenji Komiya, Nagoya (JP)

(72) Inventors: Kosei Yoshida, Gotenba (JP); Kenji Komiya, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/379,552

(22) PCT Filed: Feb. 20, 2013

(86) PCT No.: PCT/IB2013/000222
§ 371 (c)(1),
(2) Date: Aug. 19, 2014

(87) PCT Pub. No.: WO2013/124721
PCT Pub. Date: Aug. 29, 2013

(65) Prior Publication Data
US 2015/0010839 A1    Jan. 8, 2015

(30) Foreign Application Priority Data
Feb. 23, 2012  (JP) ................. 2012-037056

(51) Int. Cl.
H01M 8/04    (2006.01)
F17C 5/00    (2006.01)

(52) U.S. Cl.
CPC .......... *H01M 8/04223* (2013.01); *F17C 5/007* (2013.01); *H01M 8/04089* (2013.01); *F17C 2205/0142* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2250/032* (2013.01); *F17C 2250/043* (2013.01); *F17C 2250/0473* (2013.01); *F17C 2250/072* (2013.01); *F17C 2265/065* (2013.01); *F17C 2270/0139* (2013.01); *Y02E 60/321* (2013.01)

(58) Field of Classification Search
USPC .......................................... 429/427, 429, 446
See application file for complete search history.

(56) References Cited

U.S. PATENT DOCUMENTS

2002/0096212 A1    7/2002  Yamada et al.

FOREIGN PATENT DOCUMENTS

| JP | 2002-206696 A | 7/2002 |
| JP | 2005-226716 A | 8/2005 |
| JP | 2007-016893 A | 1/2007 |
| JP | 2008-223784 A | 9/2008 |
| JP | 2011-163534 A | 8/2011 |
| WO | 2011/098875 A1 | 8/2011 |

*Primary Examiner* — Tracy Dove
(74) *Attorney, Agent, or Firm* — Kenyon & Kenyon LLP

(57) ABSTRACT

A gas supply system that supplies a gas after making confluence of the gas flows from gas containers includes: a supply pressure detector that detects supply pressure of the gas following the confluence; and a controller that permits a gas supply-destination apparatus to be activated if the supply pressure detected after an elapse of a determination time from a start of the gas supply is greater than or equal to a threshold pressure, and that prohibits the apparatus from being activated if the supply pressure is less than the threshold pressure. The controller uses a first determination time as the determination time if it is determined that internal pressures that are the gas pressures in the containers are not imbalanced between the containers, and uses a second determination time that is longer than the first as the determination time if it is determined that the internal pressures are imbalanced.

19 Claims, 7 Drawing Sheets

GAS SUPPLY SYSTEM

CROSS-REFERENCE TO RELATED APPLICATIONS

This is a national phase application based on the PCT International Patent Application No. PCT/IB2013/000222 filed Feb. 20, 2013, claiming priority to Japanese patent application No. 2012-037056 filed Feb. 23, 2012, the entire contents of both of which are incorporated herein by reference.

BACKGROUND OF THE INVENTION

1. Field of the Invention

The invention relates to a gas supply system. More particularly, the invention relates to a gas supply system that includes a plurality of gas containers and that is capable of avoiding an incorrect control resulting from a delay of the time of the rising of supply pressure of gas which results from a difference in pressure between gas containers.

2. Description of Related Art

In response to growing awareness about energy saving and global environment protection in these days, electric vehicles equipped with electric motors as a motive power source, for example, are coming into widespread use. Along with this trend, research and development are being vigorously Pursued on electric power sources for electric motors used as motive power sources of such electric vehicles, for example, a fuel cell that generates electricity through an electrochemical reaction of hydrogen with oxygen from the air. The hydrogen for use in the fuel cell is often in the gas state since hydrogen is easier to handle in the gas state than in the liquid state. Therefore, means often used to store hydrogen gas is, for example, a high-pressure container such as a tank or the like. Furthermore, hydrogen gas motor vehicles equipped with an internal combustion engine that burns hydrogen gas instead of a fossil fuel, for example, gasoline or the like, are drawing attention in view of environmental issues. The hydrogen gas motor vehicles are also generally equipped with a high-pressure container for storing hydrogen for substantially the same reason as mentioned above.

A material used for the aforementioned high-pressure container can be a metal, for example, iron or the like, from the viewpoint of strength and air tightness. However, from the viewpoint of weight reduction, a material obtained by reinforcing a base material of a plastic, for example, polyethylene or the like, with a reinforcing material, for example, carbon fiber or the like, for improved pressure resistance is also used. Furthermore, when the hydrogen gas stored in, for example, a high-pressure container decreases in amount as it is consumed, the high-pressure container can be re-charged from a hydrogen gas supply source that is installed at a hydrogen gas station or the like. Incidentally, the storage means for hydrogen gas can also be constructed of a plurality of high-pressure containers.

In a gas supply system which supplies a gas from a high-reassure container to a mechanism that functions by using the gas (hereinafter, sometimes referred to as "gas usage mechanism"), for example, a fuel cell, an internal combustion engine, etc., and which is equipped with a plurality of high-pressure containers, if the pressures of the gas stored in the high-pressure containers (internal pressures of the high-pressure containers) vary between a high-pressure containers, the gas flows from the high-pressure container that has relatively high internal pressure to a high-pressure container that has relatively low internal pressure, giving rise to possibility of occurrence of a phenomenon, such as a change in temperature resulting from adiabatic irreversible expansion of the gas in the high-pressure container that has relatively low internal pressure (e.g., the Joule-Thomson effect in hydrogen gas, or the like), or a delay of the rising of the pressure of the gas in the supply channel when the gas starts to be supplied to the gas usage mechanism, etc.

Therefore, in this technical field, with, regard to the aforementioned phenomenon of a change in temperature, there is a technology, for example, in which a gas supply system equipped with a plurality of high-pressure containers is provided with reverse flow prevention means, such as a check valve or the like, for preventing a gas from flowing from a gas supply channel side to the high-pressure containers, in order to prevent an event in which the gas flows from a high-pressure container that has relatively high internal pressure to a high-pressure container that has relatively low internal pressure, and heat production due to adiabatic compression of the gas (and, in the case of hydrogen gas or the like, heat production due to the Joule-Thomson effect associated with adiabatic irreversible expansion of the gas) occurs resulting in rapid rise of the temperature in the high-pressure container that has relatively low internal pressure (e.g., see Japanese Patent Application Publication No. 2002-206696 (JP 2002-206696 A)). There also exists a technology related to a gas supply system equipped with a plurality of high-pressure containers in which, in order to prevent an event in which if the high-pressure containers are charged with a gas when the remaining amounts of the gas in the high-pressure containers are not uniform (i.e., vary), heat production due to adiabatic compression of the gas associated with the charging with the gas occurs concentratedly in a high-pressure container whose remaining amount of the gas is small (whose internal pressure is low), the gas is allowed to flow between the high-pressure containers prior to the charging of the containers with the gas so as to reduce the differences between the internal pressures of the high-pressure containers (e.g., see Japanese Patent Application Publication No. 2005-226716 (JP 2005-226716 A)).

With regard to the phenomenon of delay of the rising of the pressure, however, the fact of the matter is that the latter one of the aforementioned phenomena has not drawn much attention in this technical field. That is, this technical field has not found an effective solution to the delay of the rising of the pressure in the gas supply channel which occurs when the gas starts to be supplied to a gas usage mechanism.

In the meantime, in this technical field there exists, for example, a gas supply system that is equipped with a plurality of high-pressure containers and that determines whether to continue supplying a gas to a gas usage mechanism on the basis of the pressure of the gas in a gas supply channel to the gas usage mechanism. In such a gas supply system, if the pressures of the gas stored in the high-pressure containers (internal pressure) vary among the high-pressure containers, the gas flows from a high-pressure container that has relatively high internal pressure to a high-pressure container that has relatively low internal pressure, so that the rising of the pressure in the gas supply channel when the gas starts to be supplied to the gas usage mechanism delays, as mentioned above. As a result, in the gas supply system, there arises possibility, for example, that the delay of the rising of the pressure in the gas supply channel when the gas starts to be supplied may be incorrectly recognized as resulting from insufficient amount of the gas remaining and the supply of the gas may be incorrectly stopped (and the function of the gas usage mechanism that requires supply of the gas may be incorrectly stopped).

Therefore, in this technical field there is demand for a technology in a gas supply system that supplies a gas from a plurality of gas containers to a gas usage mechanism (e.g., a fuel cell, an internal combustion engine, etc.) which makes it possible to reduce the event in which if the rising of the pressure in the gas supply channel at the time of start of supply of the gas delays due to imbalance in the internal pressure between the plurality of gas containers, it is incorrectly recognized that the remaining amount of the gas is insufficient.

SUMMARY OF THE INVENTION

The invention provides a gas supply system that includes a plurality of gas containers and that reduces the event in which if the rising of the pressure in the gas supply channel at the time of start of supply of the gas delays due to imbalance in the internal pressure between the plurality of gas containers, it is incorrectly recognized that the remaining amount of the gas is insufficient.

A first aspect of the invention is a gas supply system that supplies a gas after making confluence of flows of the gas from a plurality of gas containers in which the gas is contained, and that includes: a supply pressure detector that detects supply pressure that is a post-confluence pressure of the gas that occurs following the confluence in a supply channel of the gas; and a controller that permits a gas supply-destination apparatus to which the gas is supplied to be activated if the supply pressure detected by the supply pressure detector at a time point of elapse of a predetermined determination time following a time point at which the gas starts to be supplied is greater than or equal to a predetermined threshold pressure, and that prohibits the gas supply-destination apparatus from being activated if the supply pressure detected at the time point of elapse of the predetermined determination time is less than the threshold pressure, wherein the controller uses a first determination time as the determination time if it is determined that internal pressures each of which is pressure of the gas contained in a corresponding one of the plurality of gas containers are not imbalanced between the plurality of gas containers, and uses a second determination time that is longer than the first determination time as the determination time if it is determined that the internal pressures of the plurality of gas containers are imbalanced between the plurality of gas containers.

A second aspect of the invention is a gas supply system that supplies a gas after making confluence of flows of the gas from a plurality of gas containers in which the gas is contained, and that includes: a supply pressure detector that detects supply pressure that is a post-confluence pressure of the gas that occurs following the confluence in a supply channel of the gas; and a controller that permits a gas supply-destination apparatus to which the gas is supplied to be activated if the supply pressure detected by the supply pressure detector at a time point of elapse of a predetermined determination time following a time point at which the gas starts to be supplied is greater than or equal to a predetermined threshold pressure, and that prohibits the gas supply-destination apparatus from being activated if the supply pressure detected at the time point of elapse of the predetermined determination time is less than the threshold pressure, wherein the controller uses a first threshold pressure as the threshold pressure if it is determined that internal pressures each of which is pressure of the gas contained in a corresponding one of the plurality of gas containers are not imbalanced between the plurality of gas containers, and uses a second threshold pressure that is lower than the first threshold pressure as the threshold pressure if it is determined that the internal pressures of the plurality of gas containers are imbalanced between the plurality of gas containers.

A third aspect of the invention is a gas supply system that supplies a gas after making confluence of flows of the gas from a plurality of gas containers in which the gas is contained, and that includes: a supply pressure detector that detects supply pressure that is a post-confluence pressure of the gas that occurs following the confluence in a supply channel of the gas; and a controller that permits a gas supply-destination apparatus to which the gas is supplied to be activated if the supply pressure detected by the supply pressure detector at a time point of elapse of a predetermined determination time following a time point at which the gas starts to be supplied is greater than or equal to a predetermined threshold pressure, and that prohibits the gas supply-destination apparatus from being activated if the supply pressure detected at the time point of elapse of the predetermined determination time is less than the threshold pressure, wherein the controller uses a first determination time as the determination time and uses a first threshold pressure as the threshold pressure if it is determined that internal pressures each of which is pressure of the gas contained in a corresponding one of the plurality of gas containers are not imbalanced between the plurality of gas containers, and uses a second determination time that is longer than the first determination time as the determination time and uses a second threshold pressure that is lower than the first threshold pressure as the threshold pressure if it is determined that the internal pressures of the plurality of gas containers are imbalanced between the plurality of gas containers.

According to the first to third aspects of the invention, in the gas supply system equipped with the plurality of gas container, it is possible to reduce incorrect recognition that the remaining amount of the gas is insufficient, even if the rising of the pressure of the gas in the supply channel when the gas starts to be supplied delays due to imbalance in the internal pressure between the plurality of gas containers.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
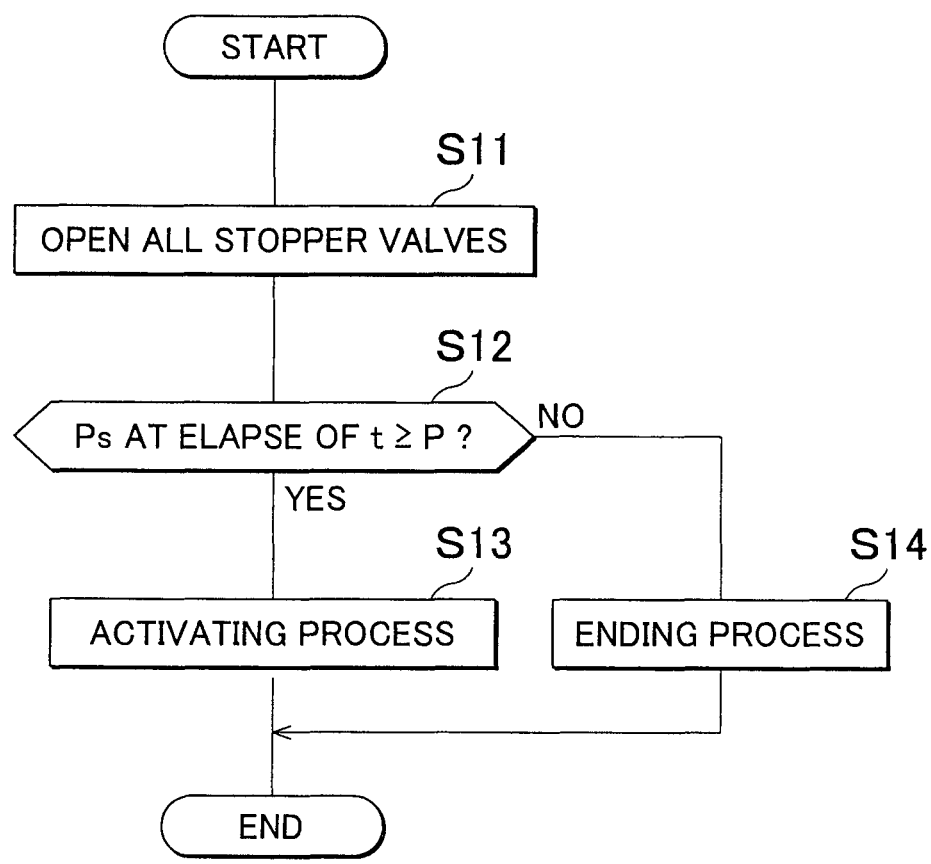
FIG. 1 is a flowchart showing a control of stopping supply of gas or of prohibiting activation of a gas supply-destination apparatus if the supply pressure of the gas is below a lower limit value that is set for the supply pressure in the gas supply system.

The invention relates to a gas supply system that includes a plurality of gas containers and that reduces it from being incorrectly recognized that the remaining amount of gas is insufficient even if the rising of the pressure in the gas supply path at the time of starting to supply the gas delays due to imbalance between the internal pressures of the gas containers. The present inventors, through vigorous studies, have found that the aforementioned incorrect recognition that the remaining amount of the gas is insufficient can be reduced by changing the criteria for determining that the remaining amount of the gas is insufficient according to whether the internal pressures of the gas containers are imbalanced between the plurality of gas containers.

More specifically, the present inventors have conceived the invention by finding that even if the rising of the pressure in the gas supply channel when the gas starts to be supplied delays due to imbalance between the internal pressures of the gas containers, incorrect determination that the remaining amount of the gas is insufficient can be reduced by a gas supply system that supplies a gas after making confluence of flows of the gas from a plurality of gas containers and that performs control as to whether to permit activation of a gas supply-destination apparatus according to whether a supply pressure Ps of the confluence of the gas at the time point of elapse of a predetermined determination time t following a time point at which the gas starts to be supplied is greater than or equal to a threshold pressure P, wherein when it is determined that the internal pressures Pi of the gas containers are imbalanced between the plurality of gas containers, the determination time t is set longer than when it is determined that the internal pressures Pi are not imbalanced.

That is, a first embodiment of the invention is a gas supply system that supplies a gas after making confluence of flows of the gas from a plurality of gas containers in which the gas is contained and that includes: a supply pressure detector that detects supply pressure Ps that is a post-confluence pressure of the gas that occurs following the confluence in a supply channel of the gas; and a controller that permits a gas supply-destination apparatus to which the gas is supplied to be activated if the supply pressure Ps detected by the supply pressure detector at a time point of elapse of a predetermined determination time t following a time point at which the gas starts to be supplied is greater than or equal to a predetermined threshold pressure P, and that prohibits the gas supply-destination apparatus from being activated if the supply pressure Ps detected at the time point of elapse of the predetermined determination time t is less than the threshold pressure P, wherein a first determination time t1 is used as the determination time t if it is determined that internal pressures Pi each of which is pressure of the gas contained in a corresponding one of the plurality of gas containers are not imbalanced between the plurality of gas containers, and a second determination time t2 that is longer than the first determination time t1 is used as the determination time t if it is determined that the internal pressures Pi of the plurality of gas containers are imbalanced between the plurality of gas containers.

As described above, the gas supply system in accordance with the embodiment is a gas supply system that supplies a gas after making confluence of flows of the gas from a plurality of gas containers in which the gas is contained. The object to which the gas supply system in accordance with the embodiment supplies the gas (gas supply-destination apparatus) is not particularly limited. Concrete examples of such gas supply-destination apparatuses include fuel cells, hydrogen-gas engines, etc. as mentioned above. Therefore, the gas that the gas supply system in accordance with the embodiment supplies is also not particularly limited. Concrete examples of the gas include hydrogen and the like as mentioned above.

The gas containers provided in the gas supply system in accordance with the embodiment may be any gas container as long as the gas container is capable of containing the gas inside and supplying the gas to an external device according to need without involving problems, such as leakage of the gas to the outside, contamination of the gas with a substance of a different species from outside, etc. For example, the gas containers provided in the gas supply system in accordance with the embodiment may be containers capable of being charged with the gas supplied from an external gas supply source and therefore supplying the gas to a gas supply-destination apparatus at least partially depending on the pressure of the gas charged in the containers. In this case, it is desirable that the gas containers be high-pressure containers (e.g., tanks, gas cylinders, etc.) that are able to withstand the pressure (internal pressure) of the gas charged in the containers.

As a material of the high-pressure containers, a metal, for example, iron or the like, can be used from the viewpoint of strength and air tightness. From the viewpoint of weight reduction, a material obtained by reinforcing a base material of a resin, for example, polyethylene or the like, with a reinforcing material, for example, carbon fiber or the like, for improved pressure resistance can also be used. Moreover, each of the gas containers provided in the gas supply system in accordance with the embodiment may also be equipped with a gas charging channel, a gas supply channel, etc. that allow the gas to be charged into the gas container and allow the gas to be supplied from the gas container. The material that forms the gas charging channel, the gas supply channel, etc. may also be appropriately selected, as is the case with the material of the high-pressure containers. Furthermore, these gas channels may also be equipped with a mechanism for controlling the charging and supplying of the gas and for suppressing unintended leakage of the gas and contamination of the gas (e.g., an open-close valve, a check valve, etc.).

By the way, if the internal pressure of a gas container of the gas supply system excessively declines, various problems are likely to result. For example, the gas supply-destination apparatus cannot be supplied with a needed amount of gas, so that the gas supply-destination apparatus cannot fully perform a desired function. Furthermore, the gas inside the gas container may run out, so that the pressure inside the gas container may become relatively negative and external air may enter the gas container due to, for example, a temperature drop of the gas container. In the case of a gas container in which a resin base material is reinforced with carbon fiber or the like, gap may form between the base material and the carbon fiber, and therefore the strength of the container may decline. Furthermore, the liner of the container may deform. Therefore, in this field of technology, there is a gas supply system in which a lower limit value is provided for the supply pressure of the gas, and in which if the supply pressure of the gas is lower than the lower limit value, it is determined that the remaining amount of the gas in the gas container is insufficient, and then a control of stopping the supply of the gas or prohibiting the activation of the gas supply-destination apparatus is performed.

The control as described above will be described in detail with reference to an accompanying drawing. FIG. 1 is a flowchart showing a control of stopping the supply of the gas or prohibiting the activation of a gas supply-destination apparatus if the supply pressure of the gas is below a lower limit value that is set for the supply pressure of the gas in the gas supply system as described above. A process routine illustrated by the flowchart can be constructed, for example, so as to be started when a starter switch is turned on in an electric vehicle that is equipped with a fuel cell battery that uses a gas supplied from the gas supply system as an electric power supply for electric motors.

As shown in FIG. 1, firstly in step S11, a main stopper valve of each of the gas containers provided in the gas supply system is opened to start supplying the gas to a gas supply-destination apparatus (e.g., the fuel cell battery, and the like) via a gas supply channel. Next, in step S12, the pressure of the gas in the supply channel at the time point of elapse of the predetermined time t following the time point at which the gas starts to be supplied (i.e., the supply pressure Ps) is detected, and it is determined whether the supply pressure Ps is greater than or equal to a threshold pressure P determined beforehand.

If in step S12 it is determined that the supply pressure Ps is greater than or equal to the threshold pressure P (Yes in step S12), it is then determined that the remaining amount of the gas in the gas container is sufficient. Then, in step S13, a process of activating the gas supply-destination apparatus is executed. On the other hand, if in step S12 it is determined that the supply pressure Ps is less than the threshold pressure P (No in step S12), it is then determined that the remaining amount of the gas in the gas container is insufficient. Then, in step S14, a process of ending operation of the gas supply-destination apparatus is executed (the activation thereof is prohibited).

For the same reason as indicated above, the gas supply system in accordance with the embodiment includes: the supply pressure detector that detects the supply pressure Ps that is a post-confluence pressure of the gas that occurs following the confluence in the supply channel of the gas; and the controller that permits a gas supply-designation apparatus to which the gas is supplied to be activated if the supply pressure Ps detected by the supply pressure detector at the time point of elapse of a predetermined determination time t following the time point at which the gas starts to be supplied is greater than or equal to the predetermined threshold pressure P, and that prohibits the gas supply-destination apparatus from being activated if the supply pressure Ps detected at the time point of elapse of the predetermined determination time t is less than the threshold pressure P. With this construction, the gas supply system of the embodiment is also able to suppress, for example, excessive decline of the internal pressure of the gas containers.

Incidentally, the supply pressure detector may be any detector as long as the detector is capable of detecting the supply pressure Ps that is the pressure of the gas that occurs following the confluence in the gas supply channel. For example, the supply pressure detector may be a pressure sensor. Furthermore, the threshold pressure P can be appropriately set on the basis of, for example, the design specifications of the gas supply system or of the gas supply-destination apparatus, etc. For example, the threshold pressure P may be set on the basis of a lower limit value of the supply pressure Ps which allows supply of an amount of the gas that is needed for the gas supply-destination apparatus. Alternatively, for a reason in terms of control or the like, if there is a need to determine whether to permit the activation of the gas supply-destination apparatus at a time point that is earlier than the time when the supply pressure Ps becomes stable at a steady value, it is permissible to adopt a construction in which time-dependent transition of the supply pressure Ps following the time of starting to supply the gas is measured through experiments or the like beforehand and, on the basis of a result of the measurement, a threshold pressure P at a desired timing of determination is set.

The gas supply system in accordance with the embodiment supplies the gas from a plurality of gas containers in which the gas is contained, after making confluence of flows of the gas from the gas containers, as described above. That is, at least portions of the supply channels connected to the individual gas containers of the gas supply system are joined together at the gas container-side of a location of connection to the gas supply-destination apparatus. Therefore, if the pressures of the gas stored in the plurality of gas containers (internal pressures of the gas containers) vary between the plurality of gas containers, there is possibility that the gas flows from a gas container that has relatively high internal pressure to a gas container that has relatively low internal pressure, causing a phenomenon in which the rising of the pressure of the gas in the supply channel (the supply pressure) delays at the time when the gas starts to be supplied to the gas supply-destination apparatus, or the like. As a result, in the gas supply system, there is possibility that, for example, a delay of the rising of the pressure in the gas supply channel at the time when the gas starts to be supplied may be incorrectly recognized as being attributed to insufficient amount of the gas remaining, and the supply of the gas may be incorrectly stopped or the activation of the gas supply-destination apparatus may be incorrectly prohibited.

By the way, the situation in which the pressures of the gas stored within the gas containers provided in the gas supply system (the internal pressures of the gas containers) vary between the plurality of gas containers can possibly result from various causes. For example, even though the internal pressures of the gas containers are balanced between the plurality of gas containers during an early period following completion of the charging process, the internal pressures of the gas containers can become imbalanced with progress of the supply of the gas, due to variations in the production-based quality of peripheral or attachment mechanisms, such as the gas containers, the gas supply channels, the main stopper valve, the check valve, the open-close valve, etc. Furthermore, imbalance in the internal pressure between the plurality of gas containers can occur in the case where a plurality of gas containers of different capacities, for example, tanks of different diameters, or the like, are charged with gas via a manifold type charging channel that branches to the individual gas containers.

Figure 2:
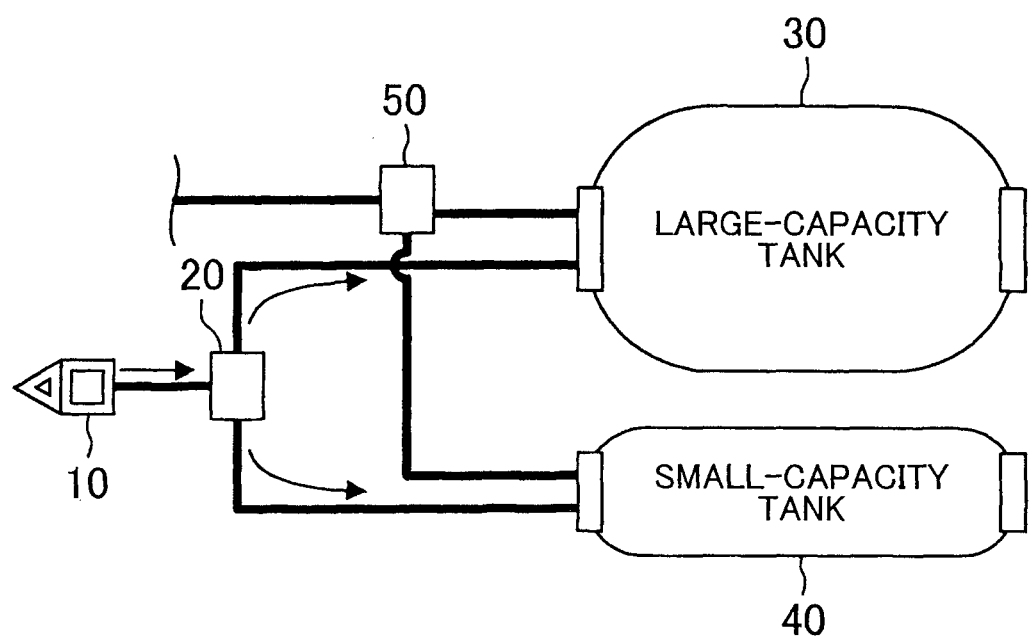
FIG. 2 is a schematic diagram illustrating an example of a general construction of a gas supply system that includes a plurality of gas containers that have different capacities.

Herein, a mechanism of imbalance occurring among the internal pressures of the gas containers will be described in detail below with reference to an accompanying drawing. FIG. 2 is a schematic diagram illustrating an example of a general construction of a gas supply system that includes a plurality of gas containers that have different capacities as mentioned above. The gas supply system shown in FIG. 2 is provided with a large-capacity gas container (tank) 30 and a small-capacity gas container (tank) 40 and is constructed so that an external gas supply source (not shown) can be connected to a charging opening 10 and so that the tanks 30 and 40 can be charged with gas via charging channels that branch from a charging channel manifold 20. Moreover, the gas supply system shown in FIG. 2 includes supply channels for supplying gas from the large-capacity gas container (tank) 30 and the small-capacity gas container (tank) 40 to a gas supply-destination apparatus (e.g., a fuel cell or the like). The supply channels join together, at a supply channel manifold 50, into one supply channel (e.g., an intermediate-pressure pipe or the like) that links to the gas supply-destination apparatus.

In the gas supply system having a construction as described above, for example, if in the case where the charging channel is of isobaric loss, the simultaneous high-speed charging of the large-capacity tank 30 and the small-capacity tank 40 is performed in a situation where the amounts of the gas remaining in the two tanks are small, the following phenomenon occurs. That is, because the initial flow rates at which the gas is charged into the two tanks are equal, the difference in the internal pressure between the large-capacity tank 30 and the small-capacity tank 40 becomes larger as the difference in capacity between the two tanks is larger. If the charging of the gas is further continued, the internal pressure difference between the two tanks eventually becomes smaller. However, if the charging of the gas is stopped halfway, an internal pressure difference between the two tanks commensurate with the capacity difference between the two tanks results.

Figure 3:
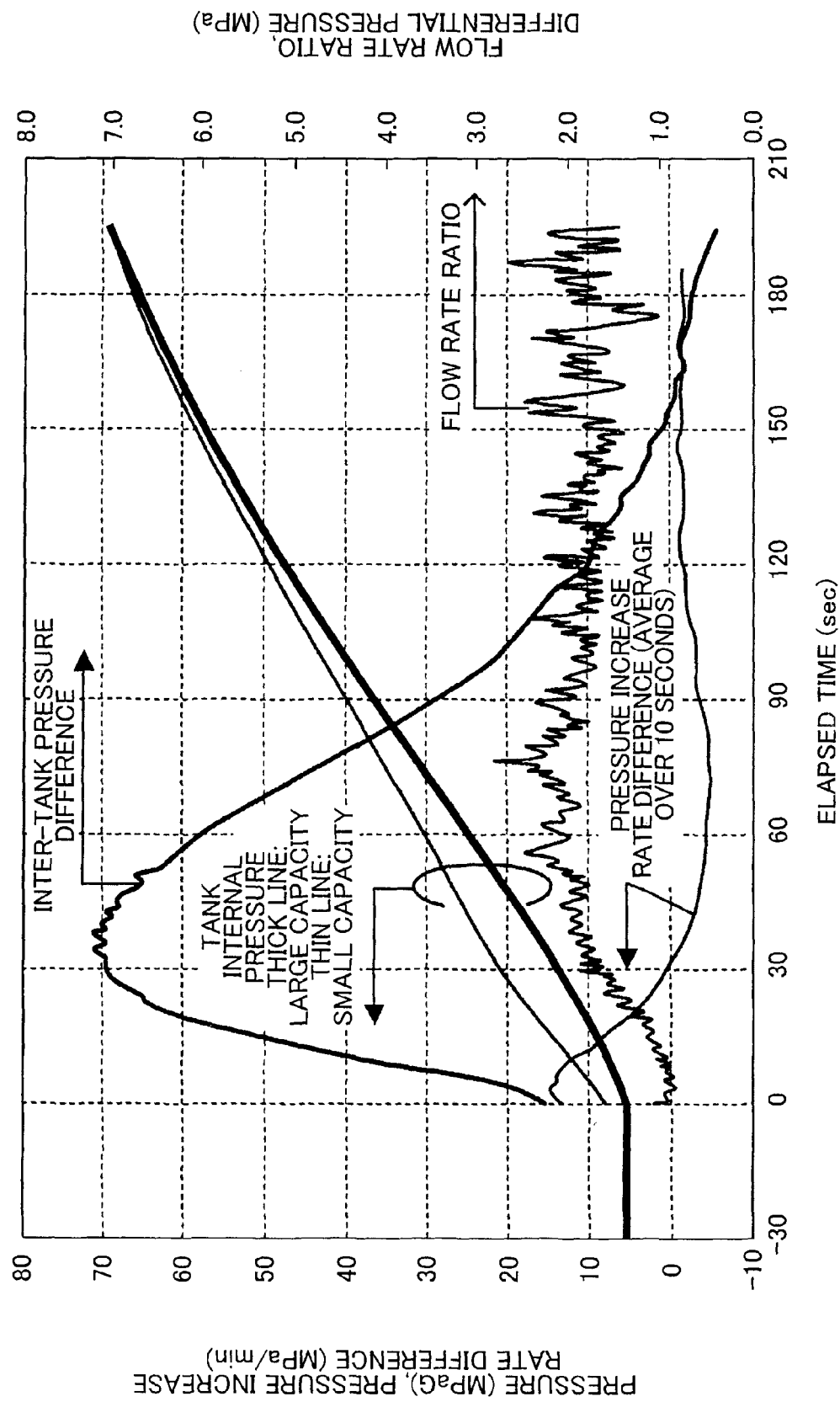
FIG. 3 is a schematic graph showing time-dependent transitions of the ratio of the flow rates (of the gas to the tanks), the difference in the pressure increase rate (between the tanks), the tank internal pressures (of the individual tanks), and the inter-tank pressure difference in the case where, in a gas supply system equipped with a plurality of gas containers having different capacities, the gas containers are simultaneously charged with the gas at high speed.

The aforementioned phenomenon will be described in detail below with reference to an accompanying drawing. FIG. 3 is a schematic graph showing time-dependent transitions of the ratio of the flow rates (of the gas to the tanks), the difference in the pressure increase rate (between the tanks), the tank internal pressures (of the individual tanks), and the inter-tank pressure difference in the case where, in a gas supply system equipped with a plurality of gas containers having different capacities, the gas containers are simultaneously charged with the gas at high speed. As shown in the graph of FIG. 3, the ratio between the flow rates of the gas to the two tanks is about 1, immediately after the charging starts. That is, at and near this time point, the large-capacity tank and the small-capacity tank are charged with the gas at substantially equal flow rates, so that the difference in the pressure increase rate between the tanks is large. As a result, at and near this time point, the tank internal pressure of the large-capacity tank (thick line) is lower than the tank internal pressure of the small-capacity tank (thin line), and thus the pressure difference between the two tanks is very large.

After that, as time elapses, the ratio between the flow rates of the gas to the two tanks becomes greater than or equal to the ratio between the capacities of the two tanks, and the difference in the pressure increase rate between the tanks turns to negative value. As a result, the tank internal pressure of the large-capacity tank (thick line) and the tank internal pressure of the small-capacity tank (thin line) become closer to each other, and the pressure difference between the two tanks becomes smaller. Therefore, in the example illustrated by the graph of FIG. 3, for example, if the charging is stopped at about 30 seconds after the charging is started, a state in which there is large difference in the internal pressure between the large-capacity tank and the small-capacity is maintained. As a result, if the supply channel is opened in order to start to supply the gas, gas flows from the small-capacity tank that has relatively high internal pressure to the large-capacity tank that has relatively low internal pressure via the supply channel, and therefore there is possibility of occurrence of the phenomenon in which the rising of the supply pressure to the gas supply-destination apparatus delays, or the like.

Figure 4:
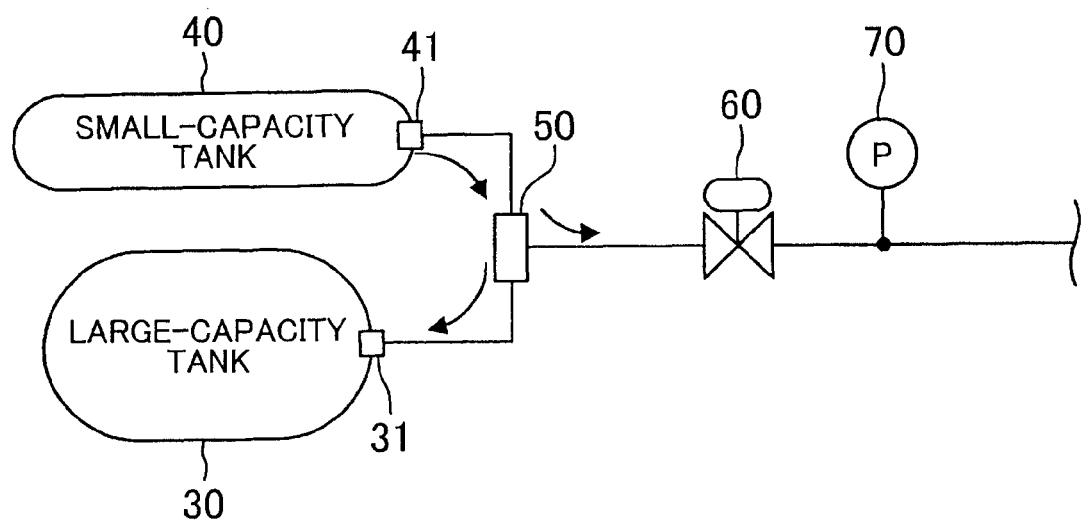
FIG. 4 is a schematic diagram illustrating an example of a general construction of a gas supply system equipped with a plurality of gas containers of different capacities.

The phenomenon in which when the gas supply channel is opened with imbalance in the internal pressure between the large-capacity tank and the small-capacity tank, the gas flows from the small-capacity tank that has relatively high internal pressure to the large-capacity tank that has relatively low internal pressure via the supply channel and therefore the rising of the supply pressure to the gas supply-destination apparatus delays will be described further in detail below with reference to an accompanying drawing. FIG. 4 is a schematic diagram illustrating an example of a general construction of a gas supply system equipped with a plurality of gas containers of different capacities. In the diagram of the gas supply system shown in FIG. 4, illustration of gas charging channels to the gas containers is omitted, unlike the diagram of the gas supply system shown in FIG. 2. On the other hand, gas supply channels from the gas containers to a gas supply-destination apparatus (not shown) are illustrated more in detail. Furthermore, FIG. 5 is a schematic graph illustrating a control of changing a criterion for permitting or prohibiting the activation of the gas supply-destination apparatus corresponding to the delay of the rising of the supply pressure of the gas which results from imbalance in the internal pressure between the plurality of gas containers, as described above, in a gas supply system in accordance with an embodiment of the invention.

As shown in FIG. 4, the large-capacity tank 30 and the small-capacity tank 40 are provided with a main stopper valve 31 and a main stopper valve 41, respectively. By opening these main stopper valves, the gas is supplied from the tanks into the supply channel. The supply channels respectively linked to the tanks are joined together in the supply channel manifold 50. The gas from the supply channel manifold 50 is then appropriately adjusted in pressure by a pressure regulating valve (pressure reducing valve) 60 before being supplied to the gas supply-destination apparatus. Incidentally, in the example shown in FIG. 4, a supply pressure detector (pressure sensor) 70 for detecting the supply pressure of the gas to the gas supply-destination apparatus is disposed between the pressure regulating valve (pressure reducing valve) 60 and the gas supply-destination apparatus. However, the location where the supply pressure detector (pressure sensor) 70 is disposed is not particularly limited as long as it is possible for the detector 70 to detect the supply pressure of the gas to the gas supply-destination apparatus. For example, the supply pressure detector (pressure sensor) 70 may be disposed at an upstream side (i.e., a gas container-side) of the pressure regulating valve (pressure reducing valve) 60.

Figure 5:
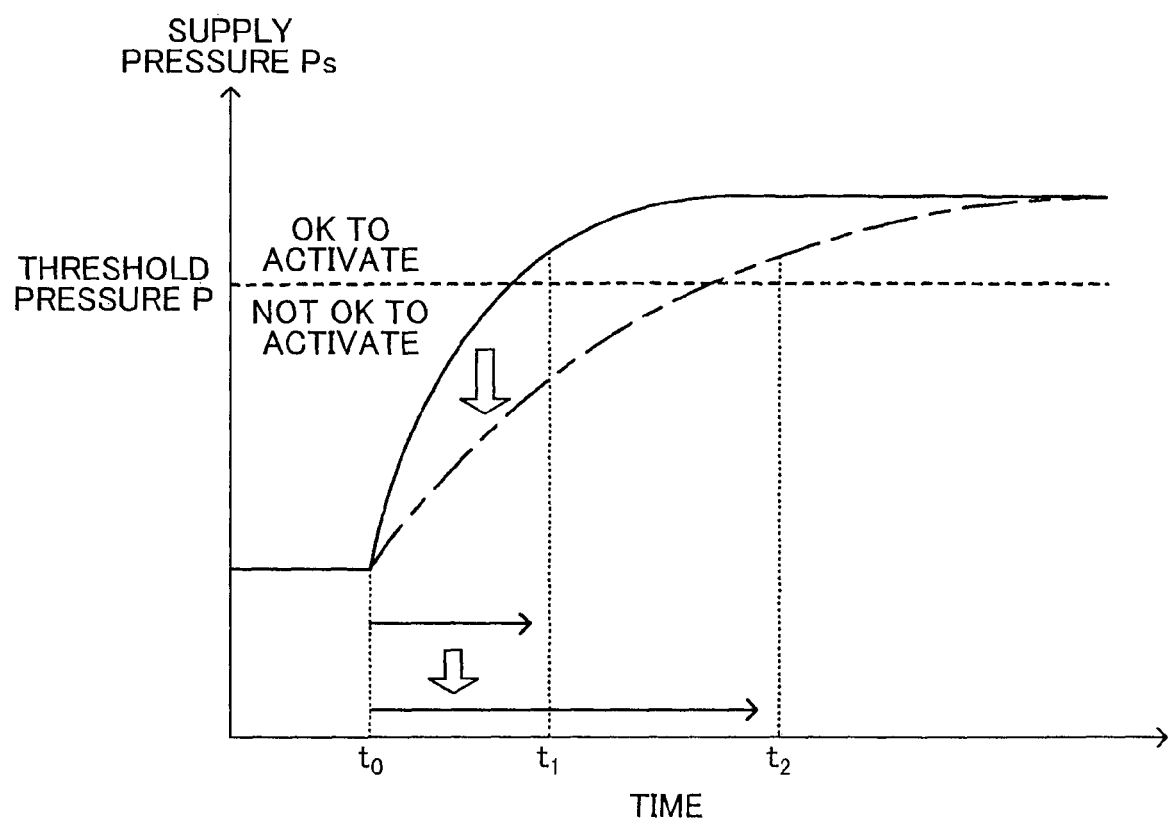
FIG. 5 is a schematic graph illustrating a control of changing a criterion for permitting or prohibiting the activation of the gas supply-destination apparatus corresponding to the delay of the rising of the supply pressure of the gas which results from imbalance in the internal pressure between a plurality of gas containers in a gas supply system in accordance with an embodiment of the invention.

If the main stopper valves 31 and 41 are opened in the case where there is not imbalance in the internal pressure between the large-capacity tank 30 and the small-capacity tank 40, the flows of the gas supplied from the two tanks 30 and 40 move simultaneously to the gas supply-destination apparatus, so that the supply pressure detected by the supply pressure detector (pressure sensor) 70 rapidly rises as shown by a solid line in the graph in FIG. 5. If the main stopper valves 31 and 41 are opened in the case where there is imbalance in the internal pressure between the large-capacity tank 30 and the small-capacity tank 40, on the other hand, the gas flows from the small-capacity tank 40 having relatively high internal pressure to the large-capacity tank 30 having relatively low internal pressure via the supply channel, so that the supply pressure detected by the supply pressure detector (pressure sensor) 70 does not rapidly rise, as shown by a one-dot chain line in the graph shown in FIG. 5.

More concretely, in the case where the internal pressures Pi of the gas containers are not imbalanced between the gas containers, the supply pressure Ps has already risen above the threshold pressure P at the time point at which the first determination time t1 elapses following the start of supply of the gas, as shown by a solid line in the graph shown in FIG. 5. On the other hand, in the case where the internal pressures Pi of the gas containers are imbalanced between the gas containers, the supply pressure Ps does not increase to or above the threshold pressure P at the time point of elapse of the first determination time t1 following the start of supply of the gas, as shown by the one-dot chain line in the graph in FIG. 5, but the supply pressure Ps increases to or above the threshold pressure P at the time point of elapse of a second determination time t2 following the start of supply of the gas.

That is, in the case where there is imbalance in the internal pressure between the large-capacity tank 30 and the small-capacity tank 40, the rising of the supply pressure to the gas supply-destination apparatus delays, that is, is slower, in comparison with the case where there is not imbalance in the internal pressure between the large-capacity tank 30 and the small-capacity tank 40 (see the upper blank arrow in FIG. 5). Therefore, if in the case where there is imbalance in the internal pressure between the large-capacity tank 30 and the small-capacity tank 40, the criterion for determining whether to permit the activation of the gas supply-destination apparatus remains the same as that used in the case where there is not imbalance in the internal pressure between the two tanks 30 and 40, there is possibility that the remaining amount of the gas may be incorrectly recognized as being insufficient and the activation of the gas supply-destination apparatus may be incorrectly prohibited in the case where there is imbalance in the internal pressure between the large-capacity tank 30 and the small-capacity tank 40.

Therefore, in the gas supply system in accordance with the embodiment, the first determination time t1 is used as the determination time t if it is determined that the internal pressures Pi that are the pressures of the gas contained in the plurality of gas containers are not imbalanced between the plurality of gas containers, and the second determination time t2 that is longer than the first determination time t2 is used as the determination time t (see the lower blank arrow in FIG. 5) if it is determined that the internal pressures Pi of the gas containers are imbalanced between the plurality of gas containers. Therefore, the gas supply system in accordance with the embodiment, while suppressing excessive decline of the internal pressures of the gas containers, avoids incorrect recognition that the remaining amount of the gas is insufficient and therefore avoids incorrect prohibition of the activation of the gas supply-destination apparatus even if the rising of the pressure in the gas supply channels at the time when the gas starts to be supplied delays due to a situation in which the internal pressures Pi that are the pressures of the gas contained in the gas containers are imbalanced between the plurality of gas containers, unlike the gas supply systems in accordance with widely employed technologies.

Incidentally, it is also possible to determine whether the internal pressures Pi are imbalanced between the plurality of gas containers by various determination methods as described later in detail. For example, it may be determined whether the internal pressures Pi are imbalanced between the plurality of gas containers on the basis of the gas charge state of the gas containers as described above. Furthermore, it may also be determined whether the internal pressures Pi are imbalanced between the plurality of gas containers on the basis of the rate of increase of the supply pressure Ps occurring during a specific length of time after the time point of starting to supply of the gas. Furthermore, it may also be determined whether the internal pressures Pi are imbalanced among the plurality of gas containers on the basis of a result of measurement of the internal pressures of the gas containers by a pressure detector, for example, pressure sensors or the like provided for the gas containers.

As for various determination processes and control processes as described above which are executed in the gas supply system in accordance with the embodiment, it is possible to adopt a construction in which those various processes are executed by an electronic control unit (ECU) that includes a CPU (Central Processing Unit), a data storage device (e.g., a ROM (Read-Only Memory), a RAM (Random Access Memory), an HDD (Hard Disk Drive), etc.), input/output ports, etc. The various determination processes and control processes as mentioned above which are executed in the gas supply system in accordance with the embodiment can be stored in, for example, a data storage device provided in the ECU, as programs in which those processes are described as algorithms for causing the CPU to execute the processes. Furthermore, the aforementioned control apparatus, such as the ECU or the like, may be a control apparatus dedicated to the gas supply system in accordance with the embodiment, and may also be constructed so as to perform a function that corresponds to the control apparatus of a gas supply-destination apparatus, for example, a fuel cell or the like.

The gas supply system in accordance with the embodiment makes it possible to accurately perform the determination as to whether to permit the activation of the gas supply-destination apparatus even in the case where there is imbalance among the internal pressures Pi of the plurality of gas containers, by changing the determination time t from the first determination time t1 to the second determination time t2 to delay the timing of determining whether the supply pressure Ps has become equal to or higher than the threshold pressure P that is used as a criterion for permitting the activation of the gas supply-destination apparatus corresponding to the delay of the rising of the supply pressure Ps which results from imbalance among the internal pressures Pi of the gas containers. However, the measure for accurately performing the determination as to whether to permit the activation of the gas supply-destination apparatus is not limited to the aforementioned measures. For example, it is permissible to change the threshold value P of the supply pressure Ps instead of delaying the timing of the determination corresponding to the delay of the rising of the supply pressure Ps which results from imbalance among the internal pressures Pi of the gas containers as described above.

That is, a second embodiment of the invention is a gas supply system that supplies a gas after making confluence of flows of the gas from a plurality of gas containers in which the gas is contained and that includes: a supply pressure detector that detects supply pressure Ps that is a post-confluence pressure of the gas that occurs following the confluence in a supply channel of the gas; and a controller that permits a gas supply-destination apparatus to which the gas is supplied to be activated if the supply pressure Ps detected by the supply pressure detector at a time point of elapse of a predetermined determination time t following a time point at which the gas starts to be supplied is greater than or equal to a predetermined threshold pressure P, and that prohibits the gas supply-destination apparatus from being activated if the supply pressure Ps detected at the time point of elapse of the predetermined determination time t is less than the threshold pressure P, wherein a first threshold pressure P1 is used as the threshold pressure P if it is determined that internal pressures Pi each of which is pressure of the gas contained in a corresponding one of the plurality of gas containers are not imbalanced between the plurality of gas containers, and a second threshold pressure P2 that is lower than the first threshold pressure P1 is used as the threshold pressure P if it is determined that the internal pressures Pi of the plurality of gas containers are imbalanced between the plurality of gas containers.

The gas supply system in accordance with the second embodiment of the invention has substantially the same construction as the gas supply system in accordance with the first embodiment of the invention, except that the system of the second embodiment changes the threshold value P of the supply pressure Ps instead of delaying the timing of determining whether the supply pressure Ps has become equal to or greater than the threshold pressure P that is used as a criterion for permitting the activation of the gas supply-destination apparatus, corresponding to the delay of the rising of the supply pressure Ps which results from imbalance between the internal pressures Pi of the plurality of gas containers. More concretely, in the gas supply system in accordance with this embodiment, the first threshold pressure P1 is used as the threshold pressure P if it is determined that the internal pressures Pi that are the pressures of the gas contained in the plurality of gas containers are not imbalanced between the plurality of gas containers, and the second threshold pressure P2 that is lower than the first threshold pressure P1 is used as the threshold pressure P if it is determined that the internal pressures Pi of the plurality of gas containers are imbalanced between the plurality of gas containers.

Figure 6:
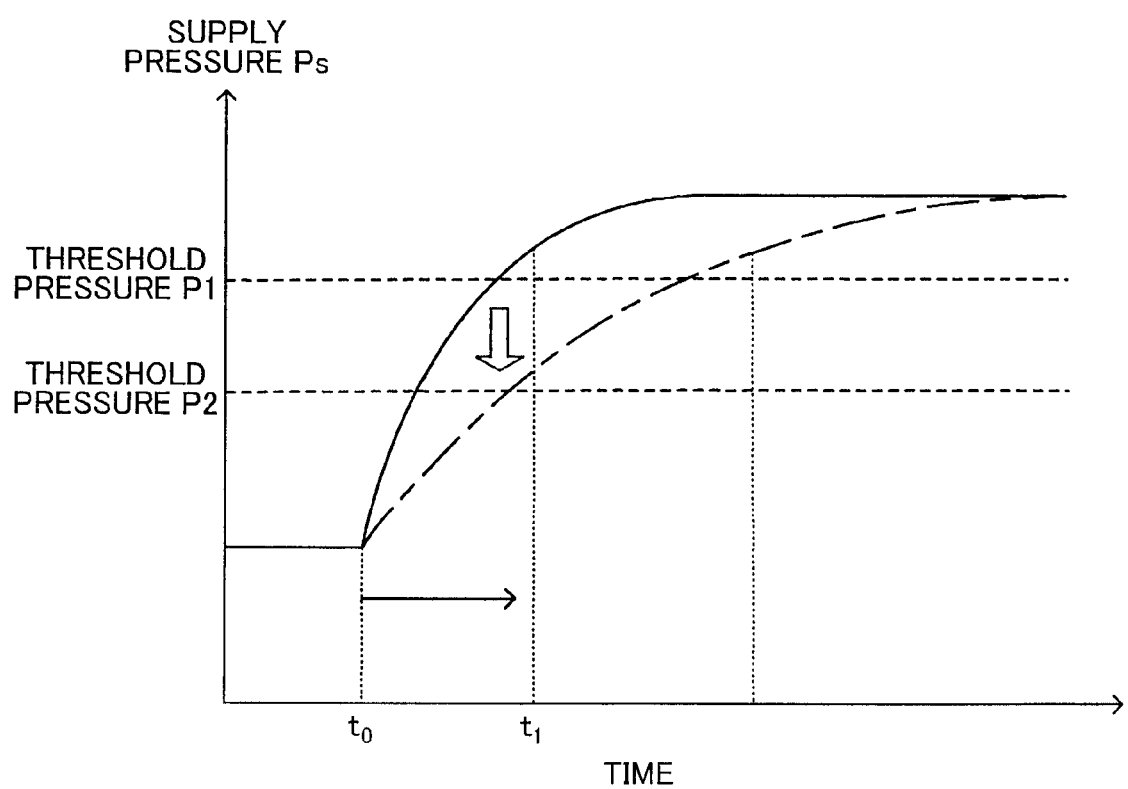
FIG. 6 is a schematic graph illustrating a control of changing the criterion for permitting or prohibiting the activation of the gas supply-destination apparatus corresponding to the delay of the rising of the supply pressure of the gas which results from imbalance in the internal pressure between a plurality of gas containers in a gas supply system in accordance with another embodiment of the invention.

The aforementioned control performed in the gas supply system in accordance with the embodiment will be described in detail below with reference to an accompanying drawing. FIG. 6 is a schematic graph illustrating a control of changing the criterion for permitting or prohibiting the activation of the gas supply-destination apparatus corresponding to the delay of the rising of the supply pressure of the gas which results from imbalance in the internal pressure between a plurality of gas containers in a gas supply system in accordance with the second embodiment of the invention. In the case where the internal pressures Pi of the gas containers are not imbalanced, as shown by a solid line in the graph in FIG. 6 as in the graph in FIG. 5, the supply pressure Ps has already risen above the first threshold pressure P1 that is the threshold pressure P used in the case where there is not imbalance in the internal pressure Pi, at the time point at which the first determination time t1 elapses following the start of supply of the gas. On the other hand, in the case where the internal pressures Pi of the gas containers are imbalanced between the plurality of gas containers, the supply pressure Ps does not increase to or above the first threshold pressure P1 at the time point of elapse of the first determination time t1 following the start of supply of the gas, as shown by a one-dot chain line in the graph in FIG. 6.

Therefore, even in the case where the internal pressures Pi of the plurality of gas containers are imbalanced between the plurality of gas containers, there is possibility that if the threshold pressure P is kept at the first threshold pressure P1, the remaining amount of the gas will be incorrectly recognized as being insufficient and the activation of the gas supply-destination apparatus will be incorrectly prohibited. However, in the gas supply system in accordance with the embodiment, in the case where the internal pressures Pi of the plurality of gas containers are imbalanced between the plurality of gas containers, the second threshold pressure P2 that is lower than the first threshold pressure P1 is used as the threshold pressure P (see a blank arrow in FIG. 6), as mentioned above. Due to this, according to the gas supply system in accordance with the embodiment, even in the case where the internal pressures Pi of the plurality of gas containers are imbalanced between the plurality of gas containers, incorrect recognition of the remaining amount of the gas as being insufficient and incorrect prohibition of the activation of the gas supply-destination apparatus will be avoided unlike the gas supply systems in accordance with the related art, so that the determination as to whether to permit the activation of the gas supply-destination apparatus can be accurately performed.

Furthermore, for example, depending on the degree of difference between the patterns of the rising of the supply pressure of the gas corresponding to the presence and the absence of imbalance in the internal pressure Pi between the plurality of gas containers, it is permissible to lower the threshold pressure P of the supply pressure Ps as in the second embodiment of the invention as well as lengthening the determination time t (delaying the determination timing) as in the first embodiment of the invention corresponding to the delay of the rising of the supply pressure Ps which results from imbalance in the internal pressure Pi between the plurality of gas containers.

That is, a third embodiment of the invention is a gas supply system that supplies a gas after making confluence of flows of the gas from a plurality of gas containers in which the gas is contained and that includes: a supply pressure detector that detects supply pressure Ps that is a post-confluence pressure of the gas that occurs following the confluence in a supply channel of the gas; and a controller that permits a gas supply-destination apparatus to which the gas is supplied to be activated if the supply pressure Ps detected by the supply pressure detector at a time point of elapse of a predetermined determination time t following a time point at which the gas starts to be supplied is greater than or equal to a predetermined threshold pressure P, and for prohibiting the gas supply-destination apparatus from being activated if the supply pressure Ps detected at the time point of elapse of the predetermined determination time t is less than the threshold pressure P, wherein a first determination time t1 is used as the determination time t and a first threshold pressure P1 is used as the threshold pressure P if it is determined that internal pressures Pi each of which is pressure of the gas contained in a corresponding one of the plurality of gas containers are not imbalanced between the plurality of gas containers, and a second determination time t2 that is longer than the first determination time t1 is used as the determination time t and a second threshold pressure P2 that is lower than the first threshold pressure P1 is used as the threshold pressure P if it is determined that the internal pressures Pi of the plurality of gas containers are imbalanced between the plurality of gas containers.

The gas supply system in accordance with the third embodiment is substantially the same as the gas supply systems in accordance with the first and second embodiments of the invention, except that the system of the third embodiment lowers the threshold value P of the supply pressure Ps as well as delaying the timing of determining whether the supply pressure Ps has become equal to or greater than the threshold pressure P that is used as the criterion for permitting the activation of the gas supply-destination apparatus, corresponding to the delay of the rising of the supply pressure Ps which results from imbalance in the internal pressure Pi between the plurality of gas containers. More concretely, in the gas supply system in accordance with this embodiment, the first determination time t1 is used as the determination time t and the first threshold pressure P1 is used as the threshold pressure P if it is determined that the internal pressures Pi that are the pressures of the gas contained in the plurality of gas containers are not imbalanced between the plurality of gas containers, and the second determination time t1 that is longer than the first determination time t1 is used as the determination time t and the second threshold pressure P2 that is lower than the first threshold pressure P1 is used as the threshold pressure P if it is determined that the internal pressures Pi of the plurality of gas containers are imbalanced between the plurality of gas containers.

Figure 7:
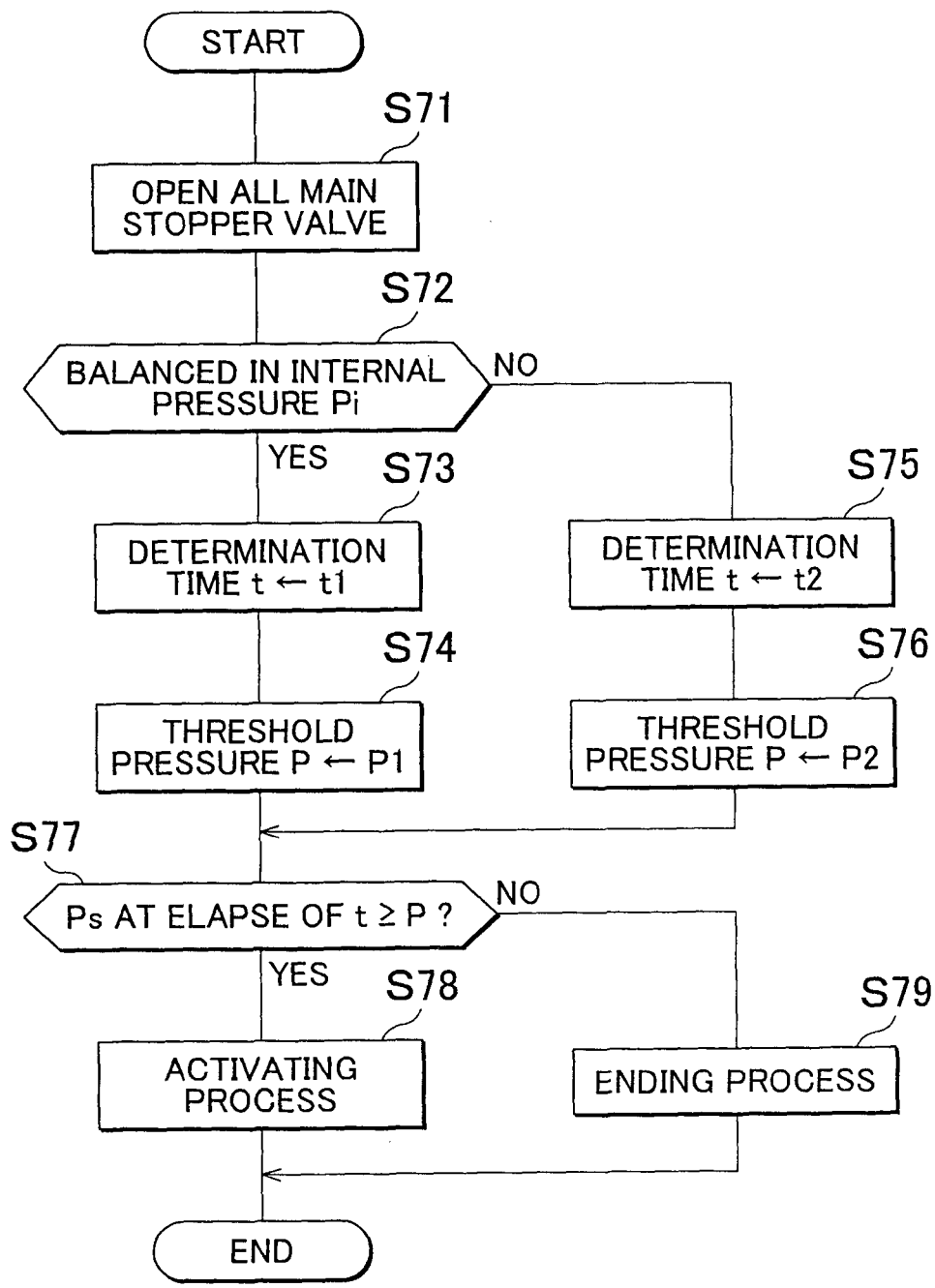
FIG. 7 is a flowchart illustrating a control of changing a determination time t and a threshold pressure P for determining whether to permit the activation of the gas supply-destination apparatus according to the presence or absence of imbalance in the internal pressure Pi between a plurality of gas containers in a gas supply system in accordance with still another embodiment of the invention.

The aforementioned control performed in the gas supply system in accordance with the embodiment will be described in detail below with reference to an accompanying drawing. FIG. 7 is a flowchart illustrating a control of changing the determination time t and the threshold pressure P for determining whether to permit the activation of the gas supply-destination apparatus according to the presence or absence of imbalance in the internal pressure Pi between a plurality of gas containers in the gas supply system in accordance with the third embodiment of the invention. As for the process routine illustrated by this flowchart, it is also possible to adopt a construction, for example, in which the process routine is started when a starter switch is turned on in an electric vehicle that has as a motive power source an electric motor that uses as an electric power supply a fuel cell that uses a gas supplied by the gas supply system.

As shown in FIG. 7, firstly in step S71, the main stopper valves of the gas containers provided in the gas supply system are opened, and the supply of the gas to a gas supply-destination apparatus (e.g., the fuel cell or the like) via the supply channel of the gas. Next, in step S72, it is determined whether the internal pressures Pi of the plurality of gas containers are balanced between the plurality of gas containers.

If in step S72 it is determined that the internal pressures Pi of the gas containers are balanced (Yes in step S72), then the first determination time t1 and the first threshold pressure P are set as the determination time t and the threshold pressure P for determining whether to permit the activation of the gas supply-destination apparatus in step S73 and step S74, respectively. On the other hand, if in step S72 it is determined that the internal pressures Pi are not balanced between the plurality of gas containers (No in step S72), then the second determination time t2 that is longer than the first determination time t1 and the second threshold pressure P2 that is lower than the first threshold pressure P1 are set as the determination time t and the threshold pressure P for determining whether to permit the activation of the gas supply-destination apparatus in step S75 and step S76, respectively.

Incidentally, the execution sequence of step S71 and steps S72 to S76 does not altogether need to be the same as described above. For example, the execution sequence of step S71 and steps S72 to S76 may be opposite to the aforementioned sequence. Besides, if steps S74 and S76 are omitted, an embodiment that corresponds to a modification of the first embodiment of the invention is obtained. If steps S73 and S75 are omitted, an embodiment that corresponds to a modification of the second embodiment of the invention is obtained.

Subsequently, in step S77, the pressure of the gas in the supply channel (supply pressure Ps) is detected at the time point at which the determination time t set as described above elapses following the time point at which the gas starts to be supplied, and then it is determined whether the supply pressure Ps is greater than or equal to the threshold pressure P set as described above.

If in step S77 it is determined that the supply pressure Ps is greater than or equal to the threshold pressure P (Yes in step S77), it is then determined that the amount of the gas remaining in the gas containers is sufficient. Then, in step S78, a process of activating the gas supply-destination apparatus is executed. On the other hand, if in step S77 it is determined that the supply pressure Ps is less than the threshold pressure P (No in step S77), it is then determined that the amount of the gas remaining in the gas containers is insufficient. Then, in step S79, a process of ending operation of the gas supply-destination apparatus is executed (the activation of the gas supply-destination apparatus is prohibited).

Hence, the gas supply system in accordance with the embodiment, while suppressing excessive decline of the internal pressures of the gas containers, is capable of certainly avoiding incorrect recognition that the remaining amount of the gas is insufficient and therefore avoiding incorrect prohibition of the activation of the gas supply-destination apparatus even if the rising of the pressure in the gas supply channels at the time of starting to supply the gas delays due to a situation in which the internal pressures Pi that are the pressures of the gas contained in the gas containers are imbalanced between the plurality of gas containers, unlike the commonly employed gas supply systems.

By the way, the first determination time t1 and the second determination time t2 mentioned above can be appropriately set, for example, on the basis of the design specifications of the gas supply system or of the gas supply-destination apparatus, etc. For example, with respect to both the case where there is not imbalance between the internal pressures Pi of the plurality of gas containers provided in the gas supply system and the case where there is imbalance between the internal pressures Pi of the plurality of gas containers, first and second time-dependent transitions of the supply pressure Ps following the start of supply of the gas may be measured beforehand through experiments or the like, and the first determination time t1 and the second determination time t2 may be set on the basis of a result of the aforementioned measurement.

That is, a fourth embodiment of the invention is a gas supply system in accordance with the first or third embodiment of the invention wherein a first time-dependent transition of the supply pressure Ps following the time point at which the gas starts to be supplied during a state in which the internal pressures Pi of the plurality of gas containers are not imbalanced between the plurality of gas containers is measured beforehand, and the first determination time t1 is determined on the basis of the first time-dependent transition, and a second time-dependent transition of the supply pressure Ps following the time point at which the gas starts to be supplied during a state in which the internal pressures Pi of the plurality of gas containers are imbalanced between the plurality of gas containers is measured beforehand, and the second determination time t2 is determined on the basis of the second time-dependent transition.

As described above, in the gas supply system in accordance with this embodiment, the first time-dependent transition of the supply pressure Ps following the time point at which the gas starts to be supplied during the state in which the internal pressures Pi of the plurality of gas containers are not imbalanced between the plurality of gas containers is measured beforehand, and the first determination time t1 is determined on the basis of the first time-dependent transition, and the second time-dependent transition of the supply pressure Ps following the time point at which the gas starts to be supplied during the state in which the internal pressures Pi are imbalanced between the plurality of gas containers is measured beforehand, and the second determination time t2 is determined on the basis of the second time-dependent transition.

More concretely, in the gas supply system in accordance with this embodiment, a, lower limit value of the supply pressure Ps at which the amount of the gas that is needed for the gas supply-destination apparatus can be supplied is set as the threshold pressure P, and with respect to both the case where there is not imbalance between the internal pressures Pi of the plurality of gas containers provided in the gas supply system and the case where there is imbalance between the internal pressures Pi of the plurality of gas containers, first and second time-dependent transitions of the supply pressure Ps following the start of supply of the gas is measured beforehand through experiments or the like, and each of the first determination time t1 and the second determination time t2 can be determined on the basis of the amount of time that is needed in order for the supply pressure Ps to reach the threshold pressure P in a corresponding one of the cases.

Alternatively, the first determination time t1 and the second determination time t2 mentioned above may also be determined, when needed, on the basis of an appropriate quantity of state regarding the gas supply system when the system starts to supply the gas, instead of having been determined beforehand. For example, the aforementioned determination time t can also be set on the basis of the pressure increase speed Vs that is the rate of increase of the supply pressure Ps occurring during a specific length of time after the time point at which the gas starts to be supplied.

That is, a fifth embodiment of the invention is a gas supply system in accordance with the first or third embodiment of the invention which sets the determination time t on the basis of the pressure increase speed Vs that is the rate of increase of the supply pressure Ps occurring during a specific length of time after the time point at which the gas starts to be supplied.

As mentioned above, in the gas supply system in accordance with the fifth embodiment, the determination time t is set on the basis of the pressure increase speed Vs that is the rate of increase of the supply pressure Ps occurring during a specific length of time after the time point at which the supply of the gas starts. Concretely, the gas supply system in accordance with this embodiment, instead of having the first determination time t1 and the second determination time t2 determined beforehand as described above, is capable of, for example, calculating the pressure increase speed Vs that is the rate of increase of the supply pressure Ps detected by the supply pressure detector during a specific length of time after the time point at which the supply of the gas starts, and setting the determination time t on the basis of the calculated pressure increase speed Vs. More concretely, for example, a length of time that is expected to be needed for the supply pressure Ps to reach a predetermined threshold pressure P can be estimated, and the determination time t can be set on the basis of the estimated length of time.

Incidentally, in the gas supply system in accordance with the embodiment, for example, in the case where the internal pressures Pi of the plurality of gas containers are not imbalanced between the plurality of gas containers, the pressure increase speed Vs is relatively high; therefore, in that case, the determination time t set on the basis of the pressure increase speed Vs may be made relatively short as described above with reference to FIG. 3. On the other hand, in the case where the internal pressures Pi are imbalanced between the plurality of gas containers, the determination time t set on the basis of the pressure increase speed Vs may be made relatively long since the pressure increase speed Vs is relatively low as described above with reference to FIG. 3. Due to this, in a gas supply system in accordance with such an embodiment, the length of the determination time t is appropriately set according to the degree of imbalance in the internal pressure Pi between the plurality of gas containers.

That is, a gas supply system in accordance with a sixth embodiment of the invention is a gas supply system in accordance with the fifth embodiment of the invention which sets the determination time t shorter as the pressure increase speed Vs is greater, and which sets the determination time t longer as the pressure increase speed Vs is smaller.

As stated above, in the gas supply system in accordance with this embodiment, the determination time t is set shorter as the pressure increase speed Vs is greater, and the determination time t is set longer as the pressure increase speed Vs is smaller. Due to this, in the gas supply system in accordance with the embodiment, the length of the determination time t is appropriately set according to the degree of imbalance in the internal pressure Pi between the plurality of gas containers. More concretely, in the gas supply system in accordance with the embodiment, a control of using the first determination time t1 as the determination time t if it is determined that the internal pressures Pi that are the pressures of the gas contained in the plurality of gas containers are not imbalanced between the plurality of gas containers and of using the second determination time t2 that is longer than the first determination time t1 as the determination time t if it is determined that the internal pressures Pi are imbalanced between the plurality of gas containers is appropriately executed on the basis of the magnitude of the pressure increase speed Vs.

By the way, as stated above, in a gas supply system equipped with a plurality of gas containers, if the pressures of gas stored in the plurality of gas containers (the internal pressures of the gas containers) vary between the gas containers, the rising of the supply pressure of the gas, when the supply channel for the gas is opened, delays as the gas flows from a gas container having relatively high internal pressure to a gas container having relatively low internal pressure. Furthermore, as stated above, due to the delay of the rising of the supply pressure, there is possibility that, for example, the amount of the gas remaining in the gas containers will be incorrectly recognized as being insufficient and therefore the activation of the gas supply-destination apparatus (e.g., a fuel cell, a hydrogen engine, etc.) will be incorrectly prohibited. The delay of the rising of the supply pressure is affected by the degree of imbalance in the internal pressure between the plurality of gas containers. Therefore, the length of the determination time t that defines the timing of determining whether the supply pressure Ps has become equal to or greater than the threshold pressure P that is a criterion for permitting the activation of the gas supply-destination apparatus may be set according to the degree of imbalance in the internal pressure between the plurality of gas containers.

That is, a seventh embodiment, of the invention is a gas supply system in accordance with the first or third embodiment of the invention which further includes an internal pressure detector that detects the internal pressures Pi of at least two gas containers of the plurality of gas containers, and which sets the determination time t on the basis of a difference $\Delta Pi$ between the internal pressures of the at least two gas containers that are detected by the internal pressure detector.

As described above, the gas supply system in accordance with this embodiment further includes the internal pressure detector that detects the internal pressures Pi of at least two gas containers of the plurality of gas containers. The internal pressure detector is not particularly limited as long as the detector is capable of detecting the internal pressures Pi of at least two gas containers of the plurality of gas containers. For example, the internal pressure detector may be a pressure sensor. Furthermore, the gas supply system in accordance with the embodiment, instead of having the first determination time t1 and the second determination time t2 determined beforehand as described above, sets the determination time t on the basis of the difference ΔPi between the internal pressures of the at least two gas containers that are detected by the internal pressure detector. Due to this, in the gas supply system in accordance with the embodiment, the length of the determination time t that defines the timing of determining whether the supply pressure Ps has become equal to or greater than the threshold pressure P that is a criterion for permitting the activation of the gas supply-destination apparatus can be set according to the degree of imbalance in the internal pressure between the plurality of gas containers.

By the way, the internal pressure of each gas container is expected to change during supply of the gas, due to various factors. Therefore, in order to correctly acquire the difference ΔPi between the internal pressures, it is permissible to detect the internal pressures Pi of the gas containers by the internal pressure detector during a period when the gas is not supplied (e.g., before supply of the gas starts).

That is, in an eighth embodiment of the invention is a gas supply system in accordance with the seventh embodiment of the invention which sets the determination time t on the basis of the difference ΔPi in the internal pressure before starting to supply the gas.

As described above, in the gas supply system in accordance with the eighth embodiment, the determination time t is set on the basis of the difference ΔPi in the internal pressure before the gas starts to be supplied. Therefore, in the gas supply system in accordance with this embodiment, the difference ΔPi between the internal pressures of at least two gas containers can be more accurately acquired.

By the way, in the gas supply system in accordance with this embodiment, the length of the determination time t may also be set according to the degree of imbalance in the internal pressure Pi between the plurality of gas containers. Concretely, the determination time t may be set relatively shorter as the degree of imbalance in the internal pressure Pi between the plurality of gas containers is smaller, and the determination time t may be set relatively longer as the degree of imbalance in the internal pressure Pi between the plurality of gas containers is greater.

That is, a ninth embodiment of the invention is a gas supply system in accordance with the seventh or eighth embodiment of the invention which sets the determination time t shorter as the difference ΔPi in the internal pressure is smaller, and which sets the determination time t longer as the difference ΔPi in the internal pressure is greater.

As described above, in the gas supply system in accordance with this embodiment, the determination time t is set shorter as the difference ΔPi in the internal pressure is smaller, and the determination time t is set longer as the difference ΔPi in the internal pressure is greater. Therefore, in the gas supply system in accordance with the embodiment, the length of the determination time t is appropriately set according to the degree of imbalance in the internal pressure Pi between the plurality of gas containers. More concretely, in the gas supply system in accordance with the embodiment, a control of using the first determination time t1 as the determination time t if it is determined that the internal pressures Pi that are the pressures of the gas contained in the plurality of gas containers are not imbalanced between the plurality of gas containers and using the second determination time t2 that is longer than the first determination time t1 as the determination time t if it is determined that the internal pressures Pi are imbalanced between the plurality of gas containers is appropriately executed on the basis of the magnitude of the difference ΔPi between the internal pressures of at least two gas containers that are detected by the internal pressure detector.

By the way, in the gas supply systems in accordance with the fourth to ninth embodiments of the invention described above, it is possible to more accurately perform the determination as to whether to permit the activation of the gas supply-destination apparatus even in the case where there is imbalance in the internal pressure Pi between the plurality of gas containers, by delaying the timing of determining whether the supply pressure Ps has become equal to or greater than the threshold pressure P that is a criterion for permitting the activation of the gas supply-destination apparatus by changing the determination time t from the first determination time t1 to the second determination time t2 corresponding to the delay of the rising of the supply pressure Ps which results from imbalance in the internal pressure Pi between the plurality of gas containers.

However, the measure for accurately performing the determination as to whether to permit the activation of the gas supply-destination apparatus as described above is not limited to the aforementioned measures. For example, it is also permissible to lower the threshold pressure P of the supply pressure Ps instead of or in addition to lengthening the determination time t corresponding to the delay of the rising of the supply pressure Ps which results from imbalance in the internal pressure Pi between the plurality of gas containers. Listed below will be gas supply systems in accordance with embodiments that correspond to the fourth to ninth embodiments of the invention which change the threshold pressure P of the supply pressure Ps instead of or as well as the determination time t corresponding to the delay of the rising of the supply pressure Ps. However, details of the construction of the gas supply system in accordance with each of the embodiments have already become apparent from the foregoing description, and will not be described again.

That is, a tenth embodiment of the invention is a gas supply system in accordance with the second or third embodiment of the invention wherein a first time-dependent transition of the supply pressure Ps following the time point at which the gas starts to be supplied during a state in which the internal pressures Pi of the plurality of gas containers are not imbalanced between the plurality of gas containers is measured beforehand, and the first threshold pressure P1 is determined on the basis of the first time-dependent transition, and a second time-dependent transition of the supply pressure Ps following the time point at which the gas starts to be supplied during a state in which the internal pressures Pi of the plurality of gas containers are imbalanced between the plurality of gas containers is measured beforehand, and the second threshold pressure P2 is determined on the basis of the second time-dependent transition.

Furthermore, an eleventh embodiment of the invention is a gas supply system in accordance with the second or third embodiment of the invention which sets the threshold pressure P on the basis of the pressure increase speed Vs that is the rate of increase of the supply pressure Ps occurring during a specific length of time after the time point at which the gas starts to be supplied.

Furthermore, a twelfth embodiment of the invention is a gas supply system in accordance with the eleventh embodiment of the invention which sets the threshold pressure P greater as the pressure increase speed Vs is greater, and which sets the threshold pressure P smaller as the pressure increase speed Vs is smaller.

Next, a thirteenth embodiment of the invention is a gas supply system in accordance with the second or third embodiment of the invention which further includes an internal pressure detector that detects the internal pressures Pi of at least two gas containers of the plurality of gas containers, and which sets the threshold pressure P on the basis of a difference ΔPi between the internal pressures of the at least two gas containers that are detected by the internal pressure detector.

Furthermore, a fourteenth embodiment of the invention is a gas supply system in accordance with the thirteenth embodiment of the invention which sets the threshold pressure P on the basis of the difference ΔPi between the internal pressures before starting to supply the gas.

Still further, a fifteenth embodiment of the invention is a gas supply system in accordance with the thirteenth or fourteenth embodiment of the invention which sets the threshold pressure P greater as the difference ΔPi between the internal pressures is smaller, and which sets the threshold pressure P smaller as the difference ΔPi between the internal pressures is greater.

By the way, it is also possible to determine whether the internal pressures Pi are imbalanced between the plurality of gas containers by various determination methods as described above. For example, it may be determined whether the internal pressures Pi are imbalanced between the plurality of gas containers on the basis of the gas charge state of the gas containers. Concretely, for example, in a gas supply system equipped with a plurality of gas containers, the pressure losses of the gas charging channels linked to the individual gas containers are different from each other, there is possibility of occurrence of a difference in the internal pressure between the plurality of gas containers. Furthermore, as described above with reference to FIGS. 2 and 3, for example, in a gas supply system equipped with a plurality of gas containers that have different capacities, if the plurality of gas chambers are simultaneously charged with the gas at high speed, there occurs a difference in the internal pressure between the gas containers of different capacities, and particularly in the case where the charging is stopped at a stage where the amount of charging is still small, the difference in the internal pressure becomes large.

As described above, if the supply channel is opened in order to start to supply the gas, the gas flows from a small-capacity tank having relatively high internal pressure to a large-capacity tank having relatively low internal pressure, so that the difference in the internal pressure between the gas containers reduces. Therefore, in the gas supply system in accordance with the invention, for example, when supply of the gas to the gas supply-destination apparatus is to be started, the presence or absence of imbalance in the internal pressure Pi between the plurality of gas containers may be determined on the basis of whether the present supply is the initial (first) supply from the gas supply system to be performed after the plurality of gas containers have been charged with the gas from an external gas supply source.

That is, a sixteenth embodiment of the invention is a gas supply system in accordance with any one of the first to fifteenth embodiments of the invention which determines that the internal pressures Pi of the plurality of gas containers are not imbalanced between the plurality of gas containers if the supply of the gas from the gas supply system is not the initial supply from the gas supply system to be performed after the plurality of gas containers have been charged with the gas from an external gas supply source, and which determines that the internal pressures Pi are imbalanced between the plurality of gas containers if the supply of the gas is the initial supply from the gas supply system to be performed after the plurality of gas containers have been charged with the gas.

As described above, in the gas supply system in accordance with the sixteenth embodiment, it is determined that the internal pressures Pi of the plurality of gas containers are not imbalanced between the plurality of gas containers if the supply of the gas from the gas supply system is not the initial supply from the gas supply system to be performed after the plurality of gas containers have been charged with the gas from an external gas supply source, and it is determined that the internal pressures Pi are imbalanced between the plurality of gas containers if the supply of the gas is the initial supply from the gas supply system to be performed after the plurality of gas containers have been charged with the gas. Therefore, in the gas supply system in accordance with this embodiment, it is determined that the internal pressures Pi of the plurality of gas containers are imbalanced between the plurality of gas containers at the time of the initial gas supply from the gas supply system when there remains imbalance in the internal pressure Pi between the plurality of gas containers resulting from, for example, different pressure losses of the charging channels linked to the plurality of gas containers, different capacities of the gas containers, etc.

As a result of the above-described construction, the gas supply system in accordance with the embodiment is able to more accurately perform the determination as to whether to permit the activation of the gas supply-destination apparatus, regardless of the presence or absence of imbalance in the internal pressure Pi between the plurality of gas containers, by appropriately changing the determination time t that defines the timing of determining whether to permit the activation of the gas supply-destination apparatus and/or the threshold pressure P of the supply pressure Ps that is a criterion for permitting the activation of the gas supply-destination apparatus, according to whether the internal pressures Pi are imbalanced between the plurality of gas containers.

Incidentally, the determination as to whether the supply of the gas from the gas supply system to be started at a certain time point is the initial supply to be performed after the plurality of gas containers have been charged with the gas from an external gas supply source can be correctly carried out by, for example, further a disposing detector, such as a sensor or the like, for detecting the open and closed states of a charging opening of the gas supply system or charging channels linked to the gas containers provided in the gas supply system when the gas containers of the system are to be charged with the gas from the external gas supply source, or the like, and storing the history of the open and closed states detected by the detector in, for example, a data storage device or the like provided in the control apparatus described above, and then referring to the history of the open and closed states when the supply of the gas is to be started. However, the method of determining whether a certain supply of the gas is the initial supply to be performed after the plurality of gas containers have been charged with the gas is not limited to the foregoing method; for example, a suitable determination method can be adopted according to the design specifications of the external gas supply source and the gas supply system in accordance with the invention, or the like.

By the way, the method of determining whether the internal pressures Pi of the plurality of gas containers are imbalanced between the plurality of gas containers is not limited to the aforementioned method, as described above. For example, whether the internal pressures Pi are imbalanced between the plurality of gas containers may be determined on the basis of the rate of increase of the supply pressure Ps occurring during a specific length of time after the time point at which the gas starts to be supplied.

That is, a seventeenth embodiment of the invention is a gas supply system in accordance with any one of the first to fifteenth embodiments of the invention which determines that the internal pressures Pi of the plurality of gas containers are not imbalanced between the plurality of gas containers if the pressure increase speed Vs that is the rate of increase of the supply pressure Ps occurring during a specific length of time after the time point at which the gas starts to be supplied is greater than or equal to a predetermined threshold speed V0, and which determines that the internal pressures Pi are imbalanced between the plurality of gas containers if the pressure increase speed Vs is less than the threshold speed V0.

As described above, in the gas supply system of the seventeenth embodiment, it is determined whether the internal pressures Pi of the plurality of gas containers are imbalanced between the plurality of gas containers on the basis of the pressure increase speed Vs that is the rate of increase of the supply pressure Ps occurring during a specific length of time after the time point at which the gas starts to be supplied. Concretely, in the gas supply system in accordance with the embodiment, for example, the pressure increase speed Vs that is the rate of increase of the supply pressure Ps detected by the supply pressure detector during the specific length of time after the gas starts to be supplied is calculated, and the calculated pressure increase speed Vs is compared with the predetermined threshold speed V0. If the pressure increase speed Vs is greater than or equal to the threshold speed V0, it is determined that the internal pressures Pi are not imbalanced between the plurality of gas containers. If the pressure increase speed Vs is less than the threshold speed V0, it is determined that the internal pressures Pi are imbalanced between the plurality of gas containers.

Incidentally, the aforementioned threshold speed V0 can be appropriately set, for example, on the basis of the design specifications of the gas supply system or of the gas supply-destination apparatus, or the like. For example, as for the threshold speed V0, it is possible to adopt a construction in which first and second time-dependent transitions of the supply pressure Ps after the gas starts to be supplied is measured through experiments or the like beforehand, with respect to both the case where there is not imbalance in the internal pressure Pi between the plurality of gas containers provided in the gas supply system and the case where there is such imbalance, and in which the threshold speed V0 is set on the basis of a result of the measurement.

By the way, the method of determining whether the internal pressures Pi of the plurality of gas containers are imbalanced between the plurality of gas containers is not limited to the above-described method, as stated above. For example, whether the internal pressure Pi are imbalanced between the plurality of gas containers may be determined on the basis of a result of measurement of the internal pressures of the plurality of gas containers by the pressure detector, such as pressure sensors or the like, that is provided for the plurality of gas containers, as described above.

That is, an eighteenth embodiment of the invention is a gas supply system in accordance with any one of the first to fifteenth embodiments which further includes an internal pressure detector that detects the internal pressures Pi of at least two gas containers of the plurality of gas containers, and which determines that the internal pressures Pi are not imbalanced between the plurality of gas containers if a difference $\Delta Pi$ between the internal pressures of the at least two gas containers that are detected by the internal pressure detector is less than a predetermined threshold internal pressure difference $\Delta Pi0$, and which determines that the internal pressures Pi are imbalanced between the plurality of gas containers if the difference $\Delta Pi$ is greater than or equal to the predetermined threshold internal difference $\Delta Pi0$.

As described above, the gas supply system in accordance with this embodiment further includes the internal pressure detector that detects the internal pressures Pi of the at least two gas containers of the plurality of gas containers. The internal pressure detector is not particularly limited as long as the detector is capable of detecting the internal pressures Pi of at least two gas containers of the plurality of gas containers. For example, the internal pressure detector may be a pressure sensor.

Incidentally, in the case where the gas supply system includes the internal pressure detector for the purpose of setting the determination time t and/or the threshold pressure P as described above, it is apparently possible that the existing internal pressure detector can be used as the internal pressure detector that is provided in the gas supply system in accordance with the embodiment.

Furthermore, in the gas supply system in accordance with the embodiment, it is determined whether the internal pressures Pi are imbalanced between the plurality of gas containers, on the basis of the difference $\Delta Pi$ between the internal pressures of the two gas containers that are detected by the internal pressure detector. Concretely, in the gas supply system in accordance with the embodiment, the internal pressures Pi of the at least two gas containers are detected by the internal pressure detector, and the difference $\Delta Pi$ between the thus-detected internal pressures Pi is calculated. If the calculated difference $\Delta Pi$ is less than a threshold internal pressure difference $\Delta Pi0$, it is determined that the internal pressures Pi are not imbalanced between the plurality of gas containers. If the difference $\Delta Pi$ is greater than or equal to the predetermined threshold internal pressure difference $\Delta Pi0$, it is determined that the internal pressures Pi are imbalanced between the plurality of gas containers.

Incidentally, the threshold internal pressure difference $\Delta Pi0$ can be appropriately set, for example, on the basis of the design specifications of the gas supply system or of the gas supply-destination apparatus, etc. For example, in a gas supply system equipped with a plurality of gas containers that have various internal pressure differences $\Delta Pi$, time-dependent transition of the supply pressure Ps occurring after the gas starts to be supplied may be measured through experiments or the like beforehand, and the threshold internal pressure difference $\Delta Pi$ may be determined at a maximum permissible value of the internal pressure difference $\Delta Pi$ which is within such a range that the delay of the rising of the supply pressure Ps is substantially not affected.

By the way, the internal pressures of the gas containers are expected to change due to various factors during a period when the gas is supplied. Therefore, in order to correctly obtain the internal pressure difference $\Delta Pi$, the internal pressures Pi of the gas containers may be detected by the internal pressure detector during a period when the gas is not supplied (e.g., before the gas starts to be supplied).

Therefore, a nineteenth embodiment of the invention is a gas supply system in accordance with the eighteenth embodiment of the invention which determines whether the internal pressures Pi of the plurality of gas containers are imbalanced between the plurality of gas containers before starting to supply the gas.

As described above, in the gas supply system in accordance with the nineteenth embodiment, the determination time t and/or the threshold pressure P is set on the basis of the internal pressure difference $\Delta Pi$ before the gas starts to be supplied. Therefore, in the gas supply system in accordance with the embodiment, the difference $\Delta Pi$ between the internal pressures of the at least two gas containers can be more accurately acquired.

While the embodiments having specific constructions have been described above for the purpose of illustrating the invention, it should be apparent that the scope of the invention is not limited to the above-described illustrative embodiments but that various modifications can be appropriately made within the scope of matters described by the appended claims and the specification.

The invention claimed is:

1. A gas supply system that supplies a gas after making confluence of flows of the gas from a plurality of gas containers in which the gas is contained, comprising:
   a supply pressure detector that detects supply pressure that is a post-confluence pressure of the gas that occurs following the confluence in a supply channel of the gas; and
   a controller that permits a gas supply-destination apparatus to which the gas is supplied to be activated if the supply pressure detected by the supply pressure detector at a time point of elapse of a predetermined determination time following a time point at which the gas starts to be supplied is greater than or equal to a predetermined threshold pressure, and that prohibits the gas supply-destination apparatus from being activated if the supply pressure detected at the time point of elapse of the predetermined determination time is less than the threshold pressure, wherein
   the controller uses a first determination time as the determination time if it is determined that internal pressures each of which is pressure of the gas contained in a corresponding one of the plurality of gas containers are not imbalanced between the plurality of gas containers, and uses a second determination time that is longer than the first determination time as the determination time if it is determined that the internal pressures of the plurality of gas containers are imbalanced between the plurality of gas containers.

2. A gas supply system that supplies a gas after making confluence of flows of the gas from a plurality of gas containers in which the gas is contained, comprising:
   a supply pressure detector that detects supply pressure that is a post-confluence pressure of the gas that occurs following the confluence in a supply channel of the gas; and
   a controller that permits a gas supply-destination apparatus to which the gas is supplied to be activated if the supply pressure detected by the supply pressure detector at a time point of elapse of a predetermined determination time following a time point at which the gas starts to be supplied is greater than or equal to a predetermined threshold pressure, and that prohibits the gas supply-destination apparatus from being activated if the supply pressure detected at the time point of elapse of the predetermined determination time is less than the threshold pressure, wherein
   the controller uses a first threshold pressure as the threshold pressure if it is determined that internal pressures each of which is pressure of the gas contained in a corresponding one of the plurality of gas containers are not imbalanced between the plurality of gas containers, and uses a second threshold pressure that is lower than the first threshold pressure as the threshold pressure if it is determined that the internal pressures of the plurality of gas containers are imbalanced between the plurality of gas containers.

3. A gas supply system that supplies a gas after making confluence of flows of the gas from a plurality of gas containers in which the gas is contained, comprising:
   a supply pressure detector that detects supply pressure that is a post-confluence pressure of the gas that occurs following the confluence in a supply channel of the gas; and
   a controller that permits a gas supply-destination apparatus to which the gas is supplied to be activated if the supply pressure detected by the supply pressure detector at a time point of elapse of a predetermined determination time following a time point at which the gas starts to be supplied is greater than or equal to a predetermined threshold pressure, and that prohibits the gas supply-destination apparatus from being activated if the supply pressure detected at the time point of elapse of the predetermined determination time is less than the threshold pressure, wherein
   the controller uses a first determination time as the determination time and uses a first threshold pressure as the threshold pressure if it is determined that internal pressures each of which is pressure of the gas contained in a corresponding one of the plurality of gas containers are not imbalanced between the plurality of gas containers, and uses a second determination time that is longer than the first determination time as the determination time and uses a second threshold pressure that is lower than the first threshold pressure as the threshold pressure if it is determined that the internal pressures of the plurality of gas containers are imbalanced between the plurality of gas containers.

4. The gas supply system according to claim 1, wherein:
   a first time-dependent transition of the supply pressure following the time point at which the gas starts to be supplied during a state in which the internal pressures of the plurality of gas containers are not imbalanced between the plurality of gas containers is measured beforehand, and the first determination time is determined on the basis of the first time-dependent transition; and
   a second time-dependent transition of the supply pressure following the time point at which the gas starts to be supplied during a state in which the internal pressures of the plurality of gas containers are imbalanced between the plurality of gas containers is measured beforehand, and the second determination time is determined on the basis of the second time-dependent transition.

5. The gas supply system according to claim 1, wherein the first determination time and the second determination time are set based on pressure increase speed that is rate of increase of the supply pressure occurring during a specific length of time after the time point at which the gas starts to be supplied.

6. The gas supply system according to claim 5, wherein the first determination time and the second determination time are set shorter as the pressure increase speed is greater, and set longer as the pressure increase speed is smaller.

7. The gas supply system according to claim 1, further comprising
   an internal pressure detector that detects the internal pressures of at least two gas containers of the plurality of gas containers, wherein
   the first determination time and the second determination time are set based on a difference ($\Delta Pi$) between the internal pressures of the at least two gas containers that are detected by the internal pressure detector.

8. The gas supply system according to claim 7, wherein the first determination time and the second determination time are set based on the difference between the internal pressures before the gas starts to be supplied.

9. The gas supply system according to claim 7, wherein the first determination time and the second determination time are set shorter as the difference in the internal pressure is smaller, and are set longer as the difference in the internal pressure is greater.

10. The gas supply system according to claim 2, wherein:
a first time-dependent transition of the supply pressure following the time point at which the gas starts to be supplied during a state in which the internal pressures of the plurality of gas containers are not imbalanced between the plurality of gas containers is measured beforehand, and the first threshold pressure is determined based on the first time-dependent transition; and
a second time-dependent transition of the supply pressure following the time point at which the gas starts to be supplied during a state in which the internal pressures of the plurality of gas containers are imbalanced between the plurality of gas containers is measured beforehand, and the second threshold pressure is determined on the basis of the second time-dependent transition.

11. The gas supply system according to claim 2, wherein the first threshold pressure and the second threshold pressure are set based on pressure increase speed that is rate of increase of the supply pressure occurring during a specific length of time after the time point at which the gas starts to be supplied.

12. The gas supply system according to claim 11, wherein the first threshold pressure and the second threshold pressure are set greater as the pressure increase speed is greater, and are set smaller as the pressure increase speed is smaller.

13. The gas supply system according to claim 2, further comprising
an internal pressure detector that detects the internal pressures of at least two gas containers of the plurality of gas containers, wherein
the first threshold pressure and the second threshold pressure are set based on a difference between the internal pressures of the at least two gas containers that are detected by the internal pressure detector.

14. The gas supply system according to claim 13, wherein the first threshold pressure and the second threshold pressure are set based on the difference between the internal pressures before the gas starts to be supplied.

15. The gas supply system according to claim 13, wherein the first threshold pressure and the second threshold pressure are set greater as the difference between the internal pressures is smaller, and are set smaller as the difference between the internal pressures is greater.

16. The gas supply system according to claim 1, wherein the controller determines that the internal pressures of the plurality of gas containers are not imbalanced between the plurality of gas containers if the supply of the gas from the gas supply system is not an initial supply from the gas supply system to be performed after the plurality of gas containers have been charged with the gas from an external gas supply source, and determines that the internal pressures are imbalanced between the plurality of gas containers if the supply of the gas is the initial supply from the gas supply system to be performed after the plurality of gas containers have been charged with the gas.

17. The gas supply system according to claim 1, wherein the controller determines that the internal pressures of the plurality of gas containers are not imbalanced between the plurality of gas containers if pressure increase speed that is rate of increase of the supply pressure occurring during a specific length of time after the time point at which the gas starts to be supplied is greater than or equal to a predetermined threshold speed, and determines that the internal pressures are imbalanced between the plurality of gas containers if the pressure increase speed is less than the threshold speed.

18. The gas supply system according to claim 1, further comprising
an internal pressure detector that detects the internal pressures of at least two gas containers of the plurality of gas containers, wherein
the controller determines that the internal pressures are not imbalanced between the plurality of gas containers if a difference between the internal pressures of the at least two gas containers that are detected by the internal pressure detector is less than a predetermined threshold internal pressure difference, and determines that the internal pressures are imbalanced between the plurality of gas containers if the difference is greater than or equal to the predetermined threshold internal pressure difference.

19. The gas supply system according to claim 18, wherein the controller determines whether the internal pressures of the plurality of gas containers are imbalanced between the plurality of gas containers before the gas starts to be supplied.

* * * * *